US012747179B2

(12) United States Patent
Fokine et al.

(10) Patent No.: US 12,747,179 B2
(45) Date of Patent: Sep. 29, 2026

(54) METHOD AND APPARATUS FOR ADDITIVE MANUFACTURING OF A GLASS OBJECT

(71) Applicants: Michael Fokine, Saltsjö-Boo (SE); Taras Oriekhov, Täby (SE); Chunxin Liu, Stockholm (SE)

(72) Inventors: Michael Fokine, Saltsjö-Boo (SE); Taras Oriekhov, Täby (SE); Chunxin Liu, Stockholm (SE)

(73) Assignee: Nobula3D AB, Stockholm (SE)

( * ) Notice: Subject to any disclaimer, the term of this patent is extended or adjusted under 35 U.S.C. 154(b) by 19 days.

(21) Appl. No.: 18/568,712

(22) PCT Filed: Jul. 11, 2022

(86) PCT No.: PCT/EP2022/069235
§ 371 (c)(1),
(2) Date: Dec. 8, 2023

(87) PCT Pub. No.: WO2023/285340
PCT Pub. Date: Jan. 19, 2023

(65) Prior Publication Data

US 2024/0269919 A1 Aug. 15, 2024

(30) Foreign Application Priority Data

Jul. 14, 2021 (SE) .................................. 2150940-1

(51) Int. Cl.
*B33Y 10/00* (2015.01)
*B29C 64/118* (2017.01)
(Continued)

(52) U.S. Cl.
CPC ............ *C03B 19/00* (2013.01); *B29C 64/118* (2017.08); *B29C 64/209* (2017.08);
(Continued)

(58) Field of Classification Search
CPC ........ C03B 19/00; B33Y 10/00; C03C 25/106
See application file for complete search history.

(56) References Cited

U.S. PATENT DOCUMENTS 5,714,196 A * 2/1998 Vacha .................. C03C 25/106
427/163.2
6,143,378 A 11/2000 Harwell et al.
(Continued)

FOREIGN PATENT DOCUMENTS

CN 106277749 A 1/2017
EP 2979850 A2 2/2016
(Continued)

OTHER PUBLICATIONS

International Preliminary Report on Patentability for PCT/EP2022/069235 completed Oct. 9, 2023, 15 pages.
(Continued)

*Primary Examiner* — Erin Snelting
(74) *Attorney, Agent, or Firm* — NIXON & VANDERHYE

(57) ABSTRACT

The present invention relates to an additive manufacturing method and apparatus for forming a three-dimensional component/object of glass including the steps of: feeding a glass filament material in an essentially horizontal direction towards a stage, heating the glass filament material such that the glass fiber material becomes or remains molten/softened; and depositing the molten/softened glass material onto a surface of the stage or object, in which the molten/softened glass material is forming the three-dimensional component/object of glass; wherein during at least part of the depositing the three-dimensional component of glass being formed rests on an essentially vertical stage, the molten/softened glass material is deposited layer-by-layer and one or more computers control wherein each layer the molten/softened
(Continued)

glass material is deposited, by controlling a set of actuators that actuate movement of the glass filament and/or the stage.

13 Claims, 4 Drawing Sheets

(51) Int. Cl.

| | |
|---|---|
| ***B29C 64/209*** | (2017.01) |
| ***B29C 64/245*** | (2017.01) |
| ***B29C 64/268*** | (2017.01) |
| ***B29C 64/295*** | (2017.01) |
| ***B33Y 30/00*** | (2015.01) |
| ***B33Y 40/10*** | (2020.01) |
| ***B33Y 70/00*** | (2020.01) |
| ***C03B 19/00*** | (2006.01) |
| ***C03C 25/1095*** | (2018.01) |

(52) U.S. Cl.

CPC .......... *B29C 64/245* (2017.08); *B29C 64/268* (2017.08); *B29C 64/295* (2017.08); *B33Y 10/00* (2014.12); *B33Y 30/00* (2014.12); *B33Y 40/10* (2020.01); *B33Y 70/00* (2014.12); *C03C 25/1095* (2013.01)

(56) References Cited

U.S. PATENT DOCUMENTS

| | | | | |
|---|---|---|---|---|
| 10,266,442 | B2 | 4/2019 | Klein et al. | |
| 10,464,305 | B2 | 11/2019 | Inamura et al. | |
| 2014/0048981 | A1 | 2/2014 | Crump et al. | |
| 2016/0194233 | A1 | 7/2016 | Van Pelt | |
| 2019/0210286 | A1 | 7/2019 | Newell et al. | |
| 2019/0352210 | A1 | 11/2019 | Drewnowski et al. | |
| 2020/0039868 | A1 | 2/2020 | Rapp et al. | |
| 2020/0070415 | A1 | 3/2020 | Bracha et al. | |
| 2022/0267188 | A1 * | 8/2022 | Höner | B33Y 80/00 |

FOREIGN PATENT DOCUMENTS

| | | | |
|---|---|---|---|
| JP | 2018503592 | A | 2/2018 |
| JP | 2019535633 | A | 12/2019 |
| JP | 2022538147 | A | 8/2022 |
| WO | 2009120355 | A1 | 10/2009 |
| WO | 2017214179 | A1 | 12/2017 |
| WO | 2018163006 | A1 | 9/2018 |
| WO | 2020004659 | A1 | 1/2020 |
| WO | 2020118157 | A1 | 6/2020 |
| WO | 2020167470 | A1 | 8/2020 |
| WO | 2020198881 | A1 | 10/2020 |
| WO | 2020259898 | A1 | 12/2020 |

OTHER PUBLICATIONS

Written Opinion of the International Preliminary Report on Patentability for PCT/EP2022/069235 mailed Jun. 13, 2023, 5 pages.

International Search Report for PCT/EP2022/069235 mailed Oct. 7, 2022, 3 pages.

Written Opinion of the ISA for PCT/EP2022/069235 mailed Oct. 7, 2022, 5 pages.

Grabe et al., "Additive manufacturing of fused silica using coaxial laser glass deposition: experiment, simulation, and discussion", Algorithms and Technologies for Multispectral, Hyperspectral, and Ultraspectral Imagery XIX—Proceedings of SPIE, Mar. 8, 2021, vol. 11677, pp. 116770Z-1-116770Z-12.

Hostetler et al., "Fiberfed Printing of Free-Form Free-Standing Glass Structures", Solid Freeform Fabrication 2018: Proceedings of the 29th Annual International, 2018, pp. 994-1002.

Luo, Junjie, et al., "Additive Manufacturing of Glass for Optical Applications", Proc of SPIE, vol. 9738, 2016, pp. 97380Y-1-97380Y-9.

Office Action, issued in Japanese Patent Application No. 2024-502142 dated Jun. 11, 2026.

* cited by examiner

METHOD AND APPARATUS FOR ADDITIVE MANUFACTURING OF A GLASS OBJECT

CROSS-REFERENCE TO RELATED APPLICATIONS

This application is the U.S. national phase of International Application No. PCT/EP2022/069235 filed Jul. 11, 2022 which designated the U.S. and claims priority to SE 2150940-1 filed Jul. 14, 2021, the entire contents of each of which are hereby incorporated by reference.

TECHNICAL FIELD OF THE INVENTION

The present invention relates in general to the field of additive manufacturing. In particular, the present invention relates to a method and apparatus for forming three-dimensional component/objects from a feedstock made of glass.

BACKGROUND OF THE INVENTION

In glass 3D printing or additive manufacturing, the existing technologies include (1) hot extruding from a furnace, (2) glass rods deposition, (3) stereolithography/ink-jetting with glass-polymer mixed solution, and (4) glass filament deposition.

(1) In U.S. Ser. No. 10/464,305B2 and U.S. Ser. No. 10/266,442B2 a large crucible is used to pour out molten glass, onto a build plate, in a predetermined geometry using translation stages. The drawback of this method is the risk of nozzle damaging by molten glass and is therefore limited to multicomponent silicate glasses such as soda-lime glass or borosilicate glass having a lower melting temperature. The layer thickness is about 10 mm, thus this technique is only applicable in large size printing with relatively poorer resolution. The energy consumption is the highest among all the existing technologies.

(2) In US2020/0070415A1 and WO2020/167470A1 continuous filament feeding for glass 3D printing. The printing use glass rods larger than 1 mm in diameter as raw material. Feeding rods are fed through a printing head and deposited on a substrate. Unable to print glass at temperature higher than 1700° C., limits material selection. The problem with this system is the risk of nozzle damaging by molten glass, the printing volume is limited by the glass rod volume, the gaps between fed rods lead to inhomogeneous print quality and the setup is considered to be of high mechanical complexity.

(3) In US2020/0039868A1, WO2017/214179A1, and WO2020/118157A1 glass power is mixed with liquid polymer. In the printing process, a 3D greenbody is firstly created by a polymer 3D printer. The greenbody is then subjected to a de-binding process that results in a porous body with pure glass. The porous body is sintered to finally from a “dense” glass print. The glass content in the mixture is low. Therefore, the technique can only create models commonly smaller than 10 mm because of the large volume shrinkage. The whole process takes several days and an energy intensive furnace is required for de-binding and sintering. The printing quality is poor due to the uneven shrinkage during sintering.

(4) Laser based melting of thin glass filaments or optical fibers [J. M. Hostetler et al., FIBER-FED PRINTING OF FREE-FORM FREE-STANDING GLASS STRUCTURES, Solid Freeform Fabrication 2018: Proceedings of the 29th Annual International, 994-1002], [T. Grabe, et al., Additive Manufacturing of fused silica using coaxial laser glass deposition, experiment, simulation and discussion, Proc. SPIE 11677, Laser 3D Manufacturing VIII, 116770Z (8 Mar. 2021)] have also been used for glass 3D printing. Using a laser, non-contact heating is achieved so the melt is not in constant contact with the walls of a crucible, thereby avoiding crucible corrosion and contamination of the glass melt. Here the silica glass fiber/filament is continuously fed into a hot-zone at temperatures sufficient to soften the glass. For silica glass (quartz- or fused-silica) temperatures as high as 1800 to 2000 C is required.

However, in [J. M. Hostetler et al., FIBER-FED PRINTING OF FREE-FORM FREE-STANDING GLASS STRUCTURES, Solid Freeform Fabrication 2018: Proceedings of the 29th Annual International, 994-1002] only one laser beam is used to soften the glass filament. This asymmetric heating significantly limits the directional printing capability. The inhomogeneous temperature gradient in the molten glass filament can result in high residual stress in the print risking from material failures and disruption of the printing process. This technique uses bare glass filament which means in prior to the printing the coating needs to be removed from the glass filament. This approach, however, causes the fiber to be left unprotected during the last stage; the mechanical feeding of the fiber into the hot-zone. The stripping process also limits the total length of the printable glass filament (i.e., maximum mechanical stripping of less than a few meters, maximum chemical stripping less than several 10's of meters), which severely damages the continuity and capability (volume) of the 3D printing process.

In [T. Grabe, et al., Additive Manufacturing of fused silica using coaxial laser glass deposition, experiment, simulation and discussion, Proc. SPIE 11677, Laser 3D Manufacturing VIII, 116770Z (8 Mar. 2021)], one laser beam is split into 4 partial beams. However, the quality of the split beams is poor as they are not uniform Gaussian laser beams. The inhomogeneous heating problem still exists. In this method, coated glass filament is used. The coating is burnt off near the hot-zone, i.e., the hot-zone itself can be used to remove the coating. A problem with said method with commonly used fiber coatings is that it may cause unwanted combustion bi-products, be more likely to leave residues affecting the purity of the print. Another issue is that the coating can ignite and start to burn off long lengths of filament even after the heat source is turned off. Therefore, process gas is needed to suppress coating combustion. To burn off the coating, excessive energy is needed which cause massive glass vaporization during printing.

Glass vaporization is very common and hard to eliminate during laser-based glass processing. The vaporization creates unwanted fume silica particles which are adhesive to surfaces. Existence of fume silica particles raises the risk of optics contamination and destruction in the system. The control of vaporization rate and fume direction is critical.

Additive manufacturing using bare glass filaments possess poor mechanical properties, and thus are susceptible to breakage. In order for mechanical and chemical protection of the glass filament during storage and handling, a protective coating is required. The protective coating can be applied during filament fabrication.

In prior glass additive manufacturing the coating needs to be removed from the glass filament. Stripping off the coating can be performed using mechanical or chemical means (e.g., using sulfuric acid, dichloromethane) prior feeding the filament into the hot additive fabrication zone. This approach, however, causes the fiber to be left unprotected during the last stage; the mechanical feeding of the fiber into the hot-zone. As stripping the coating may further weaken the mechanical strength of the filament, this is not an ideal solution as filament breakage during printing will cause major interruptions of the printing process. Using chemical means is not preferred due to risks involved when using strong acid (sulfuric acid) or dichloromethane (carcinogenic).

In glass 3D printing, the glass filament is continuously fed to a hot-zone at 1800 to 2200° C. One common method is to feed pure glass filament. However, since most of the glass filament is produced with coating, removal of the coating is required to produce pure glass filament prior to printing. Stripping off the coating can be performed using mechanical or chemical means (e.g., using sulfuric acid, dichloromethane). The striping process limits the total length of the printable glass filament (i.e., maximum mechanical stripping is usually shorter than 2 m, maximum chemical stripping is usually shorter than 50 m), which severally damages the continuity and capability (volume) of the 3D printing process. As the filament can become brittle without coating and stripping the coating may further weaken the mechanical strength of the filament, this brings extra risks as filament breakage during printing will cause major interruptions of the printing process.

An alternative approach is to burn off the coating. As the hot-zone is heated to very high temperatures the coating will start to burn near the hot-zone, i.e., the hot-zone itself can be used to remove the coating. A problem with said method is that it may cause printing failures, combustion bi-products, be more likely to leave residues affecting the purity of the print and is not energy efficient. Yet another issue is that there is a problem of controlling the amount of burned off coating: it may happen that coating may start to burn off for the full filament length.

WO2018/163006 continuous filament feeding for glass 3D printing. The printing uses glass rods as raw material. Feeding rods are loaded in a rotating cassette and fed through a printing head and deposited on a substrate. The continuous feeding is realized by thermally bonding the rods during the process. Unable to print glass at higher temperatures limits material selection. The problem with this system is the risk of nozzle damaging by molten glass, the printing volume is limited by the cassette volume, the bonding area still generate inconsistency in the feeding, leads to inhomogeneous print quality and the setup is considered to be of high mechanical complexity.

OBJECT OF THE INVENTION

The present invention aims at obviating the aforementioned problems. A primary object of the present invention is to provide an improved apparatus for forming three-dimensional components of glass.

Another object of the invention is to provide an additive manufacturing method for forming a three-dimensional component of glass.

SUMMARY OF THE INVENTION

According to the invention at least the primary object is attained by means of the system having the features defined in the independent claims.

Preferred embodiments of the present invention are further defined in the dependent claims.

According to a first aspect of the present invention it is provided an additive manufacturing method for forming a three-dimensional component/object of glass comprising the steps of:

a. feeding a glass filament material in an essentially horizontal direction towards a stage or object;
b. heating said glass filament material such that the glass filament material becomes or remains molten/softened; and
c. depositing the molten/softened glass filament material onto a surface of said stage or object, in which the molten/softened glass filament material is forming said three-dimensional component/object of glass; wherein during at least part of the depositing the three-dimensional component of glass being formed rests on an essentially vertical stage, the molten/softened glass filament material is deposited layer-by-layer;
d. controlling the molten/softened glass filament material deposition with one or more computers and a set of actuators that actuate and the relative movement of the glass filament material and the stage.

An advantage of this embodiment is that any fumes created at the additive fabrication hot-zone of the glass filament may escape from said additive fabrication hot-zone without contaminating laser optics or without interfering with the laser beam during melting/softening of said glass filament.

In various example embodiments of the present invention said glass filament is fed essentially perpendicular to said surface of the stage or object.

The advantage of these embodiments is that the precision of the manufactured details may be increased compared to providing said glass filament essentially non perpendicular to said substrate.

In various example embodiment of the present invention at least one laser beam emanating from at least one source is used for heating said glass filament.

The advantage of these embodiment sis that one or a plurality of laser beams emanating from one or a plurality of laser beam sources may be used for heating/melting said glass filament.

In various example embodiments of the present invention glass filament material is hollow.

The advantage of these embodiments is that said hollow structure of said filament may be built in said final three-dimensional component, such as for instance microfluidic structures.

In various example embodiments of the present invention said glass filament material is having a protective film made of polyimide having a thickness in the range of 1 μm 50 μm.

The advantage of these embodiments is that said filament is protected prior to use at the same time as this protective film is automatically removed during use in additive manufacturing and exhibits very little for not saying no contamination of the manufactured material and its guiding optics for the laser beam.

In various example embodiments of the present invention said glass filament is heated by at least three laser beams having a wavelength above 2 μm.

The advantage of these embodiments is that multiple laser beams provided symmetrically around the glass filament may speed up the melting/softening time. Another advantage is that the wavelength and/or the number of laser beams may be selected to have a customized heating efficiency.

In various example embodiments of the present invention said glass filament is a coated glass fiber having a diameter in the range of 100-500 μm.

The advantage of these embodiments is that various diameters of the glass filament may be used to maximize precision or manufacturing speed. A further advantage of the present invention is that an optical fiber may be used as feedstock material.

In various example embodiments of the present invention said stage is a glass plate is having a thickness in the range of 80%-300% of the diameter of said glass filament. The thickness may be in the range of a few tenth of a mm to several cm's.

The advantage of these embodiments is that the manufacturing method is compatible with very thin substrates.

In various example embodiments of the present invention further comprising the step of preheating said glass filament prior to heating it with said at least one laser beam.

The advantage of these embodiments is that less laser power may be necessary in order to reach a desired melting/softening temperature of the glass filament. Preheating may be performed by resistive heating in a filament feeding nozzle.

In various example embodiments of the present invention the distance between a filament feeding nozzle and a point of intersection of said glass filament with said laser beam is less than 5 mm. The angle of a laser beam with respect to the surface of the stage or object to which said glass filament is to be applied may be in the range of 30-60°. A plurality of laser beams may be configured for intersecting at said glass filament essentially symmetrically around said glass filament.

The advantage of these embodiments is that the short distance increases the precision of the manufacturing of the three-dimensional component. The short distance may be used because of a self-extinguishing nature of the protective film on said glass filament. The impinging angle of said laser beam is chosen so that said hot-zone is applied in said glass filament and said stage for efficient fusing of said stage and said glass filament. The stage may further be heated from behind by means of an independent heating source such as at least one another laser beam impinging from opposite side to where said glass filament is applied on said stage.

In various example embodiments of the present invention said glass filament is made of at least two different materials plus a protective film.

The advantage of these embodiments is that functional optical waveguides may be manufactured such as optical circuits for use in telecommunication, sensing or biomedical applications.

In another aspect of the present invention, it is provided an apparatus for additive manufacturing of glass component/object comprising:

a. a stage;
b. one or more heating elements for heating of a glass filament material, such that the glass filament material becomes or remains molten/softened;
c. a filament feeding nozzle for feeding the glass filament in an essentially horizontal direction towards the stage to form said glass component/object that rests on the stage;
d. one or more computers for controlling the manufacturing, such that, the molten/softened glass material is deposited layer-by-layer, and the relative movement of the glass filament material and the stage, wherein said stage is essentially vertical.

Further advantages with and features of the invention will be apparent from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

The process invention here refers to a new Additive Manufacturing (AM) process where using a digital model, a component geometry is built by fusing filaments/fibers that are melted layer-by-layer or in batches of layers using an energy source such as a laser beam through either selective melting or simple scanning of the printed profile, following the fusion process.

This invention is about a direct manufacturing process by integrating the protective film removal of the filament with the printing process. This means, that the new process will be able to manufacture fully or near-fully dense glass components using glass filaments and will overcome all the shortcomings of the prior art glass manufacturing methods.

The new process will enable direct manufacturing of glass components without any of the safety precautions and/or health risks associated with the use of prior art glass filaments.

Figure 1A:
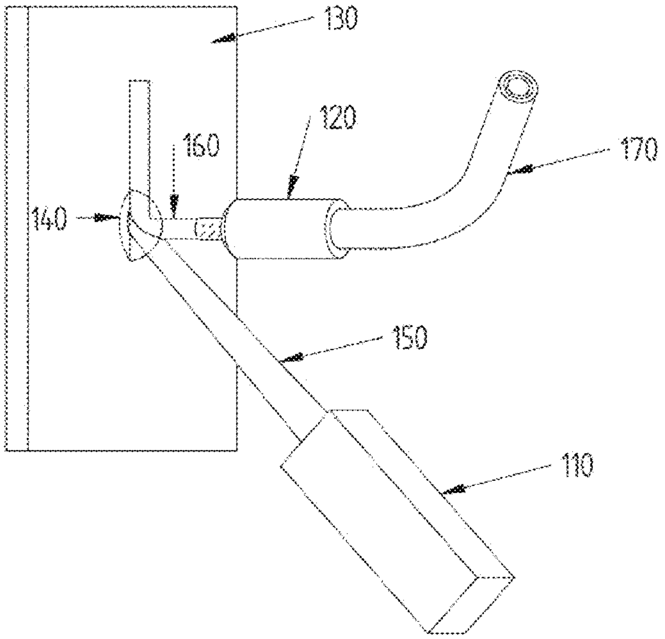
FIG. 1*a* depicts a schematic side view of a first example embodiments of an apparatus for manufacturing a three-dimensional component of glass according to the present invention.

FIG. 1*a* depicts a schematic side view of a first example embodiment of an additive manufacturing apparatus 100 according to the present invention which is configured to manufacture three-dimensional component/object in glass. Said apparatus 100 comprises a stage 130, a laser source 110 and a filament feeding nozzle 120. The filament feeding nozzle 120 may be configured to move in a plane essentially in parallel and relative to said stage 130 so that said filament feeding nozzle 120 is covering a predetermined area of said stage 130. The stage is arranged in a vertical direction. The relative movement may be that said stage 130 is fixed and said filament feeding nozzle 120 is moving in said plane. In an alternative embodiment the stage moving while said filament feeding nozzle 120 is fixed for covering the full stage 130. In yet an alternative embodiment both the stage 130 and said filament feeding nozzle 120 is in said plane for allowing said filament feeding nozzle 120 to cover the full area of said stage. By providing the stage 130 in a vertical direction, it ensures that any fumes from e.g., combustion products of coating material or vaporized/molten glass (due to overheating) moves upwards rather than towards the print head. This is beneficial as fumes otherwise could damage the print head optics and filament feeder nozzle, requiring frequent cleaning or part-replacement. Also, by said vertical arrangement of said stage 130 the relative movement of the filament feeding nozzle 120 and said stage 130 may be performed so that any fumes and gaseous material exiting from said hot-zone is configured to be out of the optical path of the laser beam and thereby improving the performance of the additive manufacturing apparatus. One or both of said filament feeding nozzle 120 and/or said stage 130 may be movable in a direction perpendicular to a surface of said stage in order to allow for additively manufacture the three-dimensional component/object and keeping a distance between the filament feeding nozzle 120 and a top surface of the stage or component/object to which a new layer is to be attached at a constant distance, i.e., for every new applied layer the stage 130 may be moved backwards (away from the printing nozzle) a distance corresponding to the thickness of new applied layer or the filament feeding nozzle 120 may be moved away from the stage with a distance corresponding to the thickness of new applied layer or a combination of movement of said stage backwards and said filament feeding nozzle 120 forward in order to keep a distance between the filament feeding nozzle 120 and a top surface of the stage or component/object to which a new layer is to be attached at a constant distance. Filament 160 may be fed to the filament feeding nozzle 120 via a flexible tube 170. The laser source 110 may be a $CO_2$-laser, CO-laser, Nd:YAG laser, fiber laser, excimer laser, nitrogen laser or the like. The laser beam 150 may be continuous or pulsed. The laser beam softens or melts the filament in a hot-zone 140 in vicinity to the stage onto which said softened or melted glass is to be attached.

The filament feeding nozzle 120 and/or the stage 130 may be arranged on at least one motorized support. A control unit may control the relative movement of said filament feeding nozzle 120 with respect to said stage 130. Said control unit may also control print head optics and laser.

In FIG. 1*a* the filament feeding nozzle 120 is providing feedstock material 160 onto a stage 130 for forming a layer of the three-dimensional component/object made of glass. A build plate may be provided on the stage 130 onto which said three-dimensional component is to be formed. The build plate may be made of any material, e.g., the same material as the final three-dimensional component, ceramic material or any other metallic material which is different to the material in said three-dimensional component.

A first step is the fusion and deposition of feedstock material onto the stage 130. The filament feeding nozzle 120 locally deposits the feedstock material along a predefined path. The filament feeding nozzle 120 may heat the feedstock material before it leaves the nozzle 120 on its way towards the stage 130. The filament feeding nozzle 120 may be adapted to the size and shape of the feedstock material. A three-axes kinematic may position the filament feeding nozzle 120 in the machine's work envelope to generate the three-dimensional component made of glass layer-by-layer. The feedstock material 160 is a glass filament. In FIG. 1*a* only one glass filament 160 is fed to the stage. In various example embodiments, multiple glass filaments 160 of various shapes and material compositions may be fed in series through the single filament feeding nozzle 120 in order to perform multi-material deposition. In FIG. 1*a* only one filament feeding nozzle 120 is used. In various example embodiments multiple filament feeding nozzles may be used in series or in parallel. In various example embodiments multiple strings of feed stock material 160 may be provided on the stage 130 simultaneously in order to provide a three-dimensional component of different materials. Different layers of the three-dimensional component may comprise different materials and/or different positions within a single layer may comprise different materials, i.e., a bi-material deposition may be made within a layer and/or in different layers.

Figure 1B:
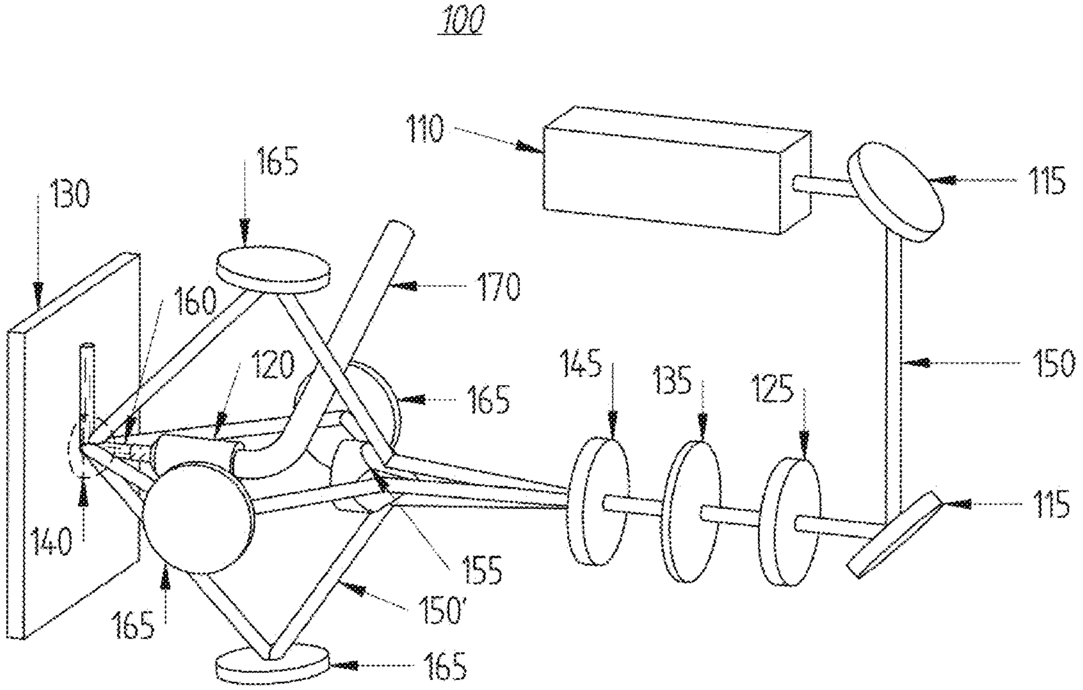
FIG. 1*b* depicts a schematic side view of a second example embodiments of an apparatus for manufacturing a three-dimensional component of glass according to the present invention.

FIG. 1*b* depicts a schematic side view of a second example embodiment of an additive manufacturing apparatus 100 according to the present invention which is configured to manufacture three-dimensional components of glass. Said apparatus 100 also comprises a vertical stage 130, a laser source 110 and a filament feeding nozzle 120. In addition, said embodiment may comprise a first beam steering mirror 115, a wave plate 125, a lens 135, a diffractive optical element (DOE) 145, a pyramid mirror 155, at least three secondary beam steering mirrors 165. At least three laser beams may be used to heat the glass filament 160. The laser emission may be operating in a wavelength region where the glass filaments have high optical absorption, which when irradiated by said laser beam 150 results in heating of the filament 160. Silica and silica-based glass filament have a strong absorption at wavelengths above 2.2 μm. Irradiating a glass filament 160 using a $CO_2$-laser (typically operating in the 9.2-10.6 μm wavelength region) or a CO-laser (operating at 5.5 μm wavelength region) results in strong absorption of radiation leading to subsequent heating of the glass filament 160.

A $CO_2$-laser operating at a wavelength of 10.6 μm may be used. At this wavelength silica glass is opaque, resulting in efficient heating. The absorption depth is approximately 2 μm to 40 μm and is efficient for heating glass filaments on the order of 100's of μm in diameter. For larger glass filaments the shallow penetration depth at 10.6 μm makes it difficult to heat rapidly. Using a CO-laser operating at 5.5 μm is more suitable for glass filaments larger than approximately 0.5 mm. The penetration depth at 5.5 μm is much larger (100's of μm) resulting in more efficient energy deposition into the glass filament 160.

A DOE 145 may be used to split the original laser beam 150 to at least three uniform laser beams 150'. Several secondary beam steering mirrors 165 may be used to direct the split laser beams 150' into the hot-zone 140. A first optional beam steering mirror 115 may be used for making the laser beam path more compact and facilitate beam alignment. The at least three second beam steering mirrors 165 deflects the at least three laser beams to a hot-zone 140 where the at least three laser beams impinge on said glass filament 160. A quarter-wave plate 125 may be used to control the polarization of the laser beam. Using a circularly polarized beam ensures that the split laser beams 150' are identical as the DOE 145 may have some polarization dependence. A circularly polarized beam can also be achieved using a reflective phase retarder as (first or second) beam steering mirror 115. A focusing lens 135 may be used to change the focal spot size at the hot-zone 140, enabling to modify the heating dynamics. The focus lens 135 may be mounted on a computer controlled motorized translation stage. The depicted DOE is a 2×2 DOE, i.e., splitting a single laser beam 150 into 4 laser beams 150'. The pyramid mirror 155 may be used to deflect the beams 150' from the DOE 145. Using a pyramid mirror 155 as depicted in FIG. 1*b* may enable a much more compact design of the optical path of the laser beams 150, 150' compared to a setup without said pyramid mirror. Said pyramid mirror 155 may also increase the stability of the laser beam at the hot-zone 140 caused by wavelength variations of the laser source 110. The diffraction angle from the DOE 145 is wavelength dependent. If the wavelength of the laser varies, the diffraction angles will vary as well. The larger the diffraction angle, the bigger is this effect. Using a DOE with a small diffraction angle therefore makes the print head less sensitive to wavelength variations. A large shift in diffraction angle will change the position of the hot-zone, making printing unstable. To enable a compact design the pyramid mirror 155 is used to increase the deflection angle of the laser beams 150'. After the pyramid mirror 155 the 4 laser beams 150' are directed to intersect at the same location on the filament 160, labeled as the hot-zone hot-140, using said second beam steering mirrors 165, one mirror 165 for each laser beam 150'. The beam steering mirror is configured to deflect the laser beam 150' in any direction. Here the second beam steering mirrors 165 are configured to deflect the 4 laser beams 150' to one and the same hot-zone hot-zone 140 on said glass filament 160. The laser beams 150' are impinging onto said glass filament 160 from different directions but essentially at the same distance from an exit of the filament feeding nozzle 120 or the top surface of a substrate arranged onto said stage 130. Due to the open architecture using 4 beams 150', filament feeding system 170 and nozzle 120 are easily added below the pyramid mirror 155 and between the laser beams 150'. A distance L between the hot-zone 140 and the exit of filament feeding nozzle 120 may be more than 10 mm, in various example embodiments said distance L may be less than 5 mm. The thickness of the substrate 130 may be from a few tenths of a mm to several cm's. The laser beams impinging onto said glass filament 160 and said substrate 130 may have and angle relative to a surface of said substrate of 45°. In various example embodiments said angle relative to a surface of said substrate may be in the range of 30-60°.

Laser and beam steering may comprise a beam tap, which couples out a few percent of the laser beam power that is monitored using a reference power meter. Input from the reference power meter is used as a feedback signal in order to stabilize laser power, using e.g., a closed-loop feedback system. A shutter may be used to turn on/off the laser beam of the print head. When off (closed) the beam is directed to a beam dump which can also be an extra power meter. When on (opened) the beam then enters the print head. In FIGS. 1*a* and 1*b* the printing is performed with the filament impinging the stage 130 in a horizontal direction. This is to ensure that any fumes from e.g., combustion products of coating material or vaporized/molten glass (due to overheating) moves upwards rather than towards the print head. This is beneficial as fumes otherwise could damage the print head optics and filament feeder nozzle, requiring frequent cleaning or part-replacement. However, using suitable gas purging the print head can be placed in any direction (upwards, downwards or sideways).

One or several filament feeders may be used to add feedstock during printing. The print stage may be a 3-(x-y-z), 4-, or 5-axis translation system holding the substrate or print profile. When using silicate glass filaments (e.g., borosilicate or soda-lime glass) the build volume may also include a heating chamber. For fused silica or fused quartz glass filaments this may be less of a problem (due to extremely low thermal expansion coefficient) and printing can be performed without extra heating. To improve bonding to the substrate, irradiation using a separate laser beam below the point where the softened glass filament is to be deposited can be used. A laser operating at visible wavelengths is used for beam alignment as both $CO_2$- and CO-laser operate in the infrared wavelength spectrum. The alignment precision may be critical to achieve homogeneous heating of the filament. The alignment technique is based on using the filament as a small interferometer.

A He—Ne laser (632.8 nm wavelength), e.g., is focused onto the filament at the specified position for the intersection of the 4 laser beams (corresponding to the hot-zone). Light from the red laser may be reflected at the two interfaces of the glass fiber. The round glass fiber may form a concentric cavity interferometer (CCI). The two reflections of the CCI may interfere with each other forming interference fringes. When the temperature increases at the location of the focused He—Ne laser, the fringes move outwards, while they move inwards when decreasing in temperature. The procedure for aligning the $CO_2$- or CO-laser beams then becomes straight forward. Each beam is precisely aligned simply by maximizing the fringe shift (increasing temperature).

One feedstock feeding nozzle 120 may provide feedstock material 160 at a first predetermined layer area of the three-dimensional component and two or more nozzles may be used for a second predetermined layer area of the three-dimensional component, i.e., the layer formation may alter between one, two, three or more nozzles depending on the shape of the layer to be formed and/or type of material to be added. In various example embodiments a plurality of nozzles for providing feed stock onto the substrate may have the same diameter or different diameters. A plurality of filament feeding nozzles may provide feedstock material of different glass materials.

In synchronization to filament extrusion, the functional point (hot-zone) is positioned according to a predefined path. This path is derived by slicing the geometry of the workpiece into layers and calculating a time-efficient trajectory for the extrusion of the filament 160. The positioning may be done by a three-axes positioning unit. It is intended to extend the manufacturing flexibility with a five-axes kinematic in order to further realign the workpiece with reference to the gravity field of Earth.

In a first option simultaneous processing with a travelling laser beam, sintering/melting the deposited glass filament 160, following in close proximity to the filament deposition.

Alternatively, sintering/melting a thin layer/s of the glass filament with high power laser beam through selective laser scanning of the latest printed layer/s. The process may require a controlled heat input and timing. To ensure geometric accuracy, in situ measurements may be made which enable the direct compensation of the process variance. Imperfections in the material may require a quality inspection of the sintered/melted glass layers. In situ quality control ensuring geometric accuracy, appropriate temperature, and gas content and pressure in the printing environment.

One or a plurality of laser beams may be used simultaneously for melting/softening the glass filament.

Bare glass filaments possess poor mechanical properties, and thus are susceptible to breakage. In order for mechanical and chemical protection of the glass filament during storage and handling, a protective coating is required. The protective coating can be applied during filament fabrication, using, e.g., a fiber draw tower used to produce optical fibers. A furnace heats the preform (large version of filament in both shape and composition). The softened glass is then pulled using a capstan in combination with a diameter gauge for the correct filament dimensions. As the filament is being pulled, the preform is fed further into the furnace. Typically, a coating resin may be introduced into a coating cup, which the filament is passing through. The coating may then be subsequently cured, either thermally or using e.g., UV lamps, prior to winding the filament onto storage and transport spools. Curing temperatures for polyimide coatings on optical fibers may typically be performed in the temperature range of about 100 to 400° C.

Polyimide coated optical fibers can survive operating temperatures of around 300° C., and are commonly used for higher-temperature (sensing) applications. Here coating thickness of 10 to 15 μm is typically used. Thicker coatings can be applied by repeating the coating procedure, adding multiple coating layers.

For glass filaments the coating thickness should be as thin as possible, while ensuring sufficient mechanical and chemical protection of the fiber. The filaments we have evaluated that gave good results have a single layer polyimide coating thickness of approximately 5 μm.

Suitable outer diameters of glass filaments are in the range 100 μm to 500 μm. The diameter has a large impact on the mechanical properties of the filament with increased diameter resulting in more stiff filaments. The translation of the nozzle and filament relative to the printed structure, during printing, results in a lateral force on the filament. A deviation of the filament position depends on viscosity and surface tension of the liquid glass in the hot-zone, as well as printing speed. A schematic of a printing nozzle and extruding filament is shown in the figure below. With a stiffer filament, the distance between the filament feeding nozzle and hot-zone can be increased. The filament diameter, nozzle design, and distance to the hot-zone therefore has a large effect on the print accuracy/quality. A large filament diameter and short extruding filament length will reduce the filament deviation during printing. Increasing the filament diameter reduces the resolution of the printer. If the extruding filament length is too short the filament feeding nozzle can be damaged by the hot-zone.

The total deflection/deviation δ is given by:

$$\delta = \frac{4FL^3}{4E\pi r^4},$$

where F is the retention force applied by the relative movement during printing process, L is the extruding filament length, E is the Young's modulus of the filament material, r is the radius of the filament. Theoretically, under the same processing conditions the filament with a diameter of 200 μm deflects one quarter to that of the filament having a diameter of 125 μm. Using a filament diameter of 200 μm and an extruding filament length smaller than 5 mm, the deflection results in sub-μm and can be considered negligible.

In glass 3D printing, the glass filament is continuously fed to a hot-zone at 1800 to 2200° C. One common method is to feed pure glass filament. However, since most of the glass filament was produced with coating, removal of the coating is required to produce pure glass filament prior to printing. Stripping off the coating can be performed using mechanical or chemical means (e.g., using sulfuric acid, dichloromethane). The striping process limits the total length of the printable glass filament i.e., maximum mechanical stripping less than a few meters, maximum chemical stripping less than a few tenths of meters, which severally damages the continuity and capability (volume) of the 3D printing process. As the filament can become brittle without coating and stripping the coating may further weaken the mechanical strength of the filament, this brings extra risks as filament breakage during printing will cause major interruptions of the printing process. Using chemical means is not preferred due to risks involved when using strong acid (sulfuric acid) or dichloromethane (carcinogenic).

Another approach is to directly feed the coated filament. With protective coating, the printable filament length is extended to kilometers range. However, as filament is commonly coated by flammable polymers e.g., acrylics, this approach can cause an open flame on the filament due to the high printing temperature, leading to the printing failure and likely destruction of the 3D printer. Besides, standard coating has a thickness at about 50 μm, considered too "thick" for glass 3D printing. Direct burning of the "thick" coating is not an ideal solution as it may produce more combustion bi-products, be more likely to leave residues affecting the purity of the print, and it is not energy efficient.

Our approach is to produce the glass filament with thin flame retardant and self-extinguishing coating. As the hot-zone is heated to very high temperatures, using $CO_2$-laser beams, the coating will start to burn near the hot-zone, i.e., the hot-zone itself can be used to remove the coating. While the coating is flame retardant, the risk of open flame is eliminated. Once the lasers and filament feeding are turned off, the combustion of the coating will stop. A thin coating will be easily burnt off. Besides increasing efficiency and reducing environmental impact, it will also reduce the production of combustion bi-products. The ideal coating may have a non-toxic chemical composition to further reduce toxic fumes produces during combustion e.g., should not contain halogens.

The inventive filament for additive manufacturing provides for the possibility to apply a thin coating layer to glass filament, while still providing mechanical and chemical protection of the filament during (temporary) storage and handling. The coating may be easily removed by thermal means (heating/plasma/laser irradiation). The coating may not contain toxic elements or produce toxic combustion products when burned. The coating may be flame retardant and self-extinguishing.

The additive manufacturing method according to the present invention may be used for producing a three-dimensional component of glass. Said method comprising the steps of feeding a glass filament having a protective film thereon to a heating source for removing said protective film and softening said glass filament and applying said softened glass filament to the surface of a substrate, wherein said protective film is made of polyimide and having a thickness in the range of 1 μm to 50 μm. The feeding of glass filament may be continuous or discontinuous.

Figure 2:
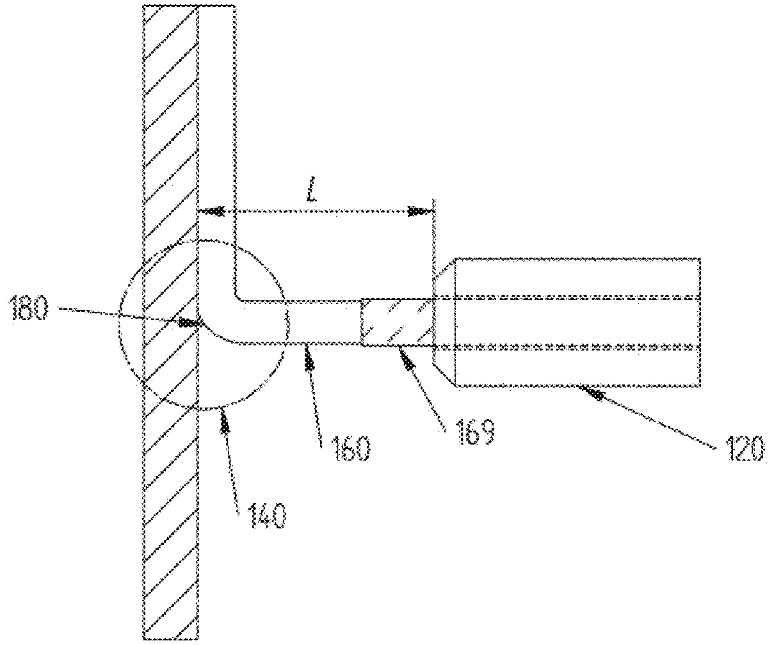
FIG. 2 depicts a schematic side view of a glass filament and a filament feeding nozzle.

FIG. 2 depicts a side view of a filament feeding nozzle 120. Extending from said filament feeding nozzle 120 is a glass filament 160 having a protective film or protective coating 169. The length of said filament from an exit of said filament feeding nozzle 120 to a hot-zone 140 where at least one laser beam impinges on said glass filament 160 is denoted by L. In various example embodiments L may be more than 10 mm or less than 5 mm. In various example embodiments the length L is less than 5 mm. A larger L may increase the filament deviation, which is the distance between a non-deviated center portion of a tip 180 of said filament 160 to a deviated center portion of the same tip 180. Any such deviation may result in a misalignment of said filament with respect of its intended position on said surface of said substrate or print/object, which in turn may result in a defective three-dimensional article and/or decreases the precision of the additive manufacturing. A small portion of the protective coating 169 will stay on the filament outside of the exit of said filament feeding nozzle 120 during additive manufacturing due to the fact that the protective coating is flame retardant and/or self-extinguishing. A length of said small portion of said remaining protective coating during manufacturing may be at least few tenth of mm.

Figure 3A:
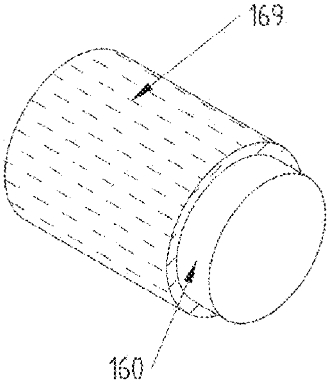
FIG. 3*a-c* depict various example embodiments of a glass filament.
Figure 3B:
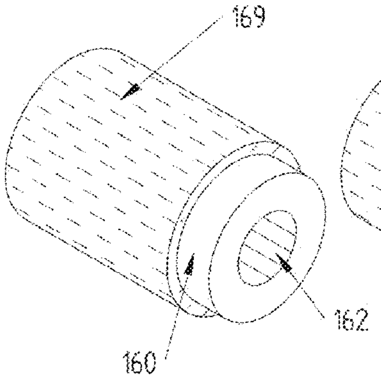
Figure 3C:
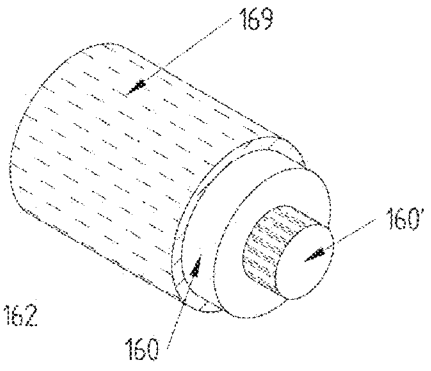

FIG. 3*a-c* depicts three different types of glass filaments 160 with protective coating 169, which may be used in the additive manufacturing process. FIG. 3*a* depicts a single composition (rod/fiber filament), where the composition (type of glass) can be high purity silica glass, e.g., fused silica, fused quartz, (used for printing high purity transparent glass). These materials have low thermal expansion coefficient. i.e., does not need heated print plate and post thermal annealing is not always necessary. Silica glass filament with $GeO_2$, $Al_2O_3$, $B_2O_3$, or F co-doping, or combinations of these. Multifilament printing (together with silica glass filament) can be used to create 3D prints with designed shape and refractive index structure. Example can be fabrication of optical fiber preforms or different optical components. Silica glass doped with rare earth oxides, of e.g., Er, Yb, Er/Yb in combination with additional dopants (e.g., $GeO_2$, $Al_2O_3$, $B_2O_3$, F). These filaments can be used to create 3D prints of active laser material. Silicates, borosilicates, alumino-boro silicates and soda-Lime glass present low(er) cost materials of standard type. Due to higher thermal expansion coefficients these may require heated printing plate and post thermal annealing to alleviate stress.

FIG. 3*b* depicts a glass filament 160 with a central air hole 162, i.e., a capillary structure. These capillary filaments can be used to print different types of glass/air structures. If pressure control is applied to the inner section of the capillary filament, active contraction/expansion of the filament during printing is possible. The volume of said air hole 162 may be between 10-70% of a volume of said glass content in said glass filament 160. The air hole 162 may be centered or non-centered in said glass filament 160. In various example embodiments said glass filament 160 may be provided with a plurality of air holes.

FIG. 3*c* depicts a glass filament 160 consisting of silica-based composition contain a central core structure 160' of a refractive index modifying dopant, e.g., $GeO_2$, $Al_2O_3$, $B_2O_3$, F. These core/cladding filaments, which function as optical waveguides, can be used to print optical circuits on different types of glass substrates for use in telecommunication, sensing or biomedical applications. Other core materials, besides glass based, include semiconductor and alloys, e.g., silicon, germanium etc.

The filament may be continuously fed towards a substrate, while simultaneously, a hot-zone created by a single or multiple laser beams bond them together. The relative motion between the substrate and the filament is under computer control to define the printed shape.

Simple structures such as micro-spheres, pillars, lines, circles and nano-tapers etc. were printed by single deposition. Printing free-standing models/arrays was also demonstrated. Multi-layer printing in complex geometry was realized. Both hollow models (vase mode) and dense models (100% infill) were printed using the glass filament. Conclusively, the glass filament is applicable to all glass 3d printing tests above and the performance is similar to the plastic filament in FDM systems.

The flame retardant and/or self-extinguishing protective film 169 is applied to the surface of the glass filament 160.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps.

The invention claimed is:

1. An additive manufacturing method for forming a three-dimensional component of glass, the method comprising:

feeding a glass filament material in an essentially horizontal direction towards an essentially vertical stage;

heating said glass filament material such that the glass filament material becomes or remains softened;

depositing the softened glass filament material onto a surface of said essentially vertical stage, in which the softened glass filament material is forming said three-dimensional component of glass, during the depositing, the three-dimensional component of glass resting only on the essentially vertical stage, the softened glass filament material being deposited layer-by-layer; and controlling the softened glass filament material deposition with one or more computers and a set of actuators that actuate a relative movement of the glass filament material and the essentially vertical stage.

2. The additive manufacturing method according to claim 1, wherein said glass filament material is fed essentially perpendicular to said surface of the essentially vertical stage.

3. The additive manufacturing method according to claim 1, wherein at least one laser beam emanating from at least one laser source is used to heat said glass filament material.

4. The additive manufacturing method according to claim 3, wherein said glass filament material is heated by at least three laser beams having a wavelength above 2 μm.

5. The additive manufacturing method according to claim 3, wherein the distance between a filament feeding nozzle and a point of intersection of said glass filament material with said at least one laser beam is less than 5 millimeters.

6. The additive manufacturing method according to claim 1, wherein a plurality of laser beams intersecting on said glass filament material have an angle in the range of 30-60° with respect to the surface of the essentially vertical stage onto which said glass filament material is provided.

7. The additive manufacturing method according to claim 6, wherein the plurality of laser beams is configured to intersect at said glass filament material essentially symmetrically around said glass filament material.

8. The additive manufacturing method according to claim 1, wherein said glass filament material has a protective film made of polyimide having a thickness in the range of 1-50 μm.

9. The additive manufacturing method according to claim 1, wherein said glass filament material is a glass fiber having a diameter in the range of 100-500 μm.

10. The method according to claim 1, wherein said glass filament material is made of at least two different materials plus a protective film.

11. The additive manufacturing method according to claim 1, wherein said glass filament material is hollow.

12. The additive manufacturing method according to claim 1, wherein said essentially vertical stage is a glass plate having a thickness in the range of 80%-300% of the diameter of said glass filament material.

13. The additive manufacturing method according to claim 1, further comprising preheating said glass filament material prior to heating the glass filament material with at least one laser beam.

* * * * *